United States Patent

[11] 3,577,716

| [72] | Inventors | Horace G. McCarty<br>Leola;<br>Lawrence M. Halls; Edmund O. Howell,<br>New Holland, Pa.; Joseph C. Hurlburt,<br>Leola, Pa. |
|------|-----------|---|
| [21] | Appl. No. | 755,318 |
| [22] | Filed | Aug. 26, 1968 |
| [45] | Patented | May 4, 1971 |
| [73] | Assignee | Sperry Rand Corporation<br>New Holland, Pa. |

[54] MOWING DEVICE
2 Claims, 7 Drawing Figs.

| [52] | U.S. Cl. | 56/259, 56/297 |
|------|----------|---|
| [51] | Int. Cl. | A01d 55/02 |
| [50] | Field of Search | 56/26.5, 259, 297, 296, 306, 275 |

[56] References Cited
UNITED STATES PATENTS

| 1,647,867 | 11/1927 | Hutsell | 56/297X |
| 1,672,363 | 6/1928 | Brown | 56/297 |
| 1,724,300 | 8/1929 | Moncreiffe | 56/297 |
| 2,515,343 | 7/1950 | Gravely | 56/259X |

*Primary Examiner*—Louis G. Mancene
*Assistant Examiner*—J. A. Oliff
*Attorneys*—Joseph A. Brown, John C. Thompson and James J. Kennedy

ABSTRACT: A mowing device comprising a frame structure, a split sickle mounted in the frame structure and drive means disposed on either side of said frame structure for independently driving each of said sickle halves so that the knife elements fixed to the sickle bars cut crop materials directed thereto across the entire length of the sickle.

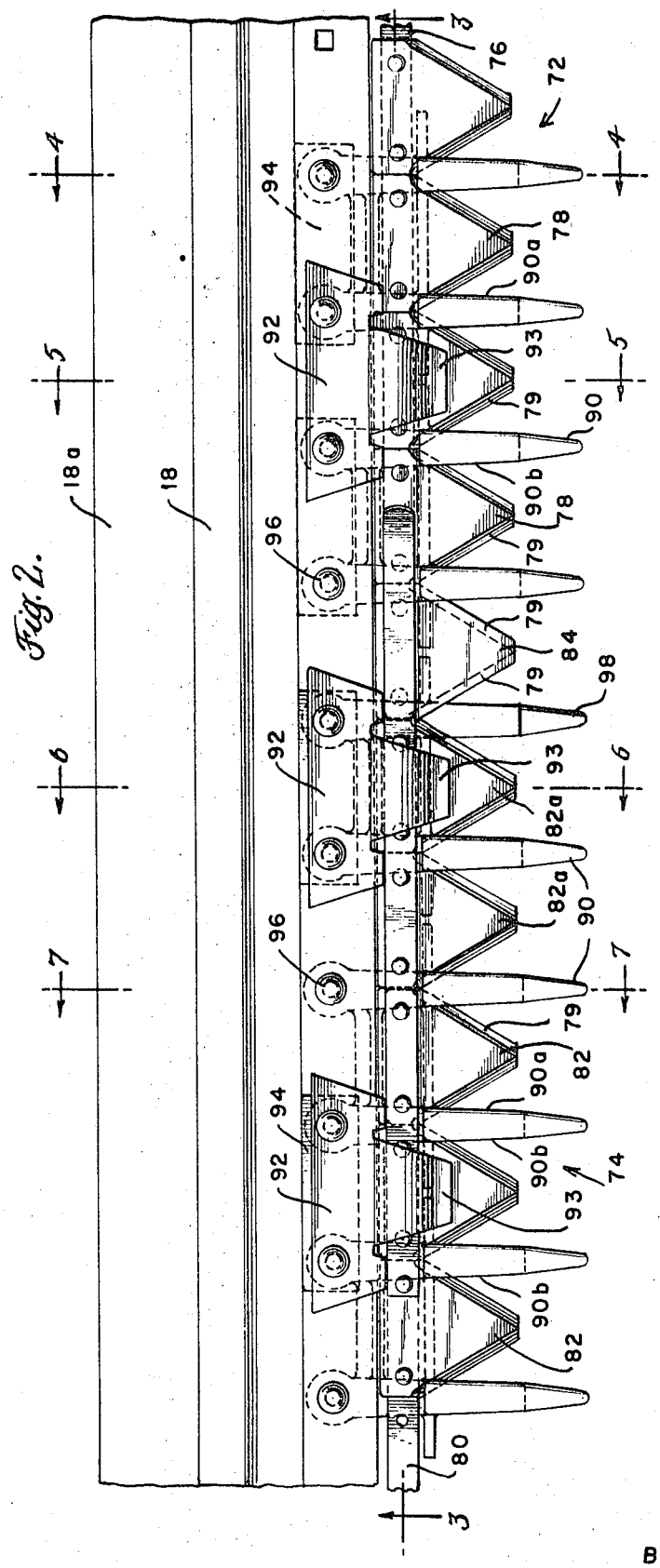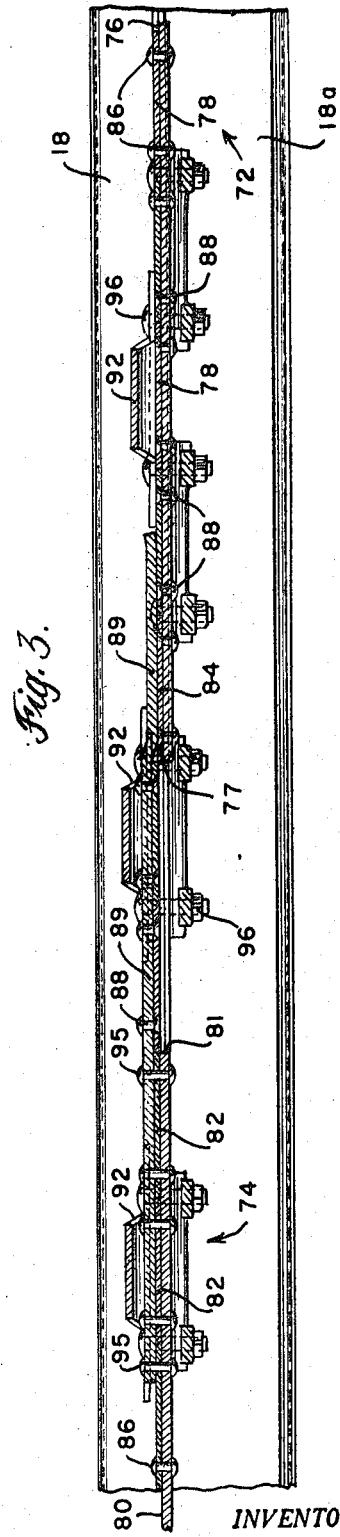

PATENTED MAY 4 1971　　　3,577,716

INVENTORS
HORACE G. MC CARTY
LAWRENCE M. HALLS
EDMUND O. HOWELL
& JOSEPH C. HURLBURT
BY *James C. Kennedy*
ATTORNEY 3,577,716

MOWING DEVICE

BACKGROUND OF THE INVENTION

During the past several years the trend in farm machinery manufacture has been to develop larger and more efficient machines that can complete their assigned tasks faster than previously available equipment. The trend toward increased machine size and faster operating speed has been applied particularly to large forage- or grain-cutting machines such as windrowers, forage harvesters, or combines.

The cutting elements for each of the above machines are usually reciprocating sickles which extend across the lower front portions of the machine header. As the machine headers are increased in size, a corresponding increase in the length of the sickle bar assemblies must also be achieved. Problems have arisen in this area, because the trend toward increased machine size and faster operating speed is opposed by a practical limit of the energy that can be alternately applied to and extracted from individual reciprocating sickle assemblies, since the longer sickle assemblies and the higher operating speeds increase this energy transfer to the point where supporting forces become excessively amplified and destructive vibrations are generated.

SUMMARY OF THE INVENTION

Accordingly, the present invention relates generally to the problems encountered by the trends in manufacture of larger and faster operating farm machinery, and specifically to a sickle assembly design for header members for certain types of this operating machinery.

An objective of the present invention is the design of a long sickle assembly for use on a larger header which is comprised of a pair of sickles which reciprocate conversely.

Another object of the invention is the design of split, half-length sickles which are driven independently from each side of the header frame structure.

A further objective of the present invention is the design of split sickles which meet near or at the middle of the header so that the sickle assembly will cut across the entire length of header.

A still further object of the invention is to reduce the length and mass of the individual knife assemblies to permit increased reciprocating frequency and cutting speed without an excessive energy transfer or prohibitive loading.

Further, the present invention produces a dynamic symmetry which provides a force and mass transfer equilibrium which notably reduces header vibrations.

BRIEF DESCRIPTION OF THE DRAWINGS

FIG. 2 is an enlarged plan view of the central portions of the sickle, i.e., the region where the right- and left-hand sickle assemblies overlap.

FIG. 3 is a longitudinal section view, taken on line 3–3 of FIG. 2, illustrating the arrangement of the knives of the right-hand sickle assembly in a plane one knife thickness higher than the knives of the right-hand sickle assembly.

DESCRIPTION OF THE PREFERRED EMBODIMENT

Figure 1:
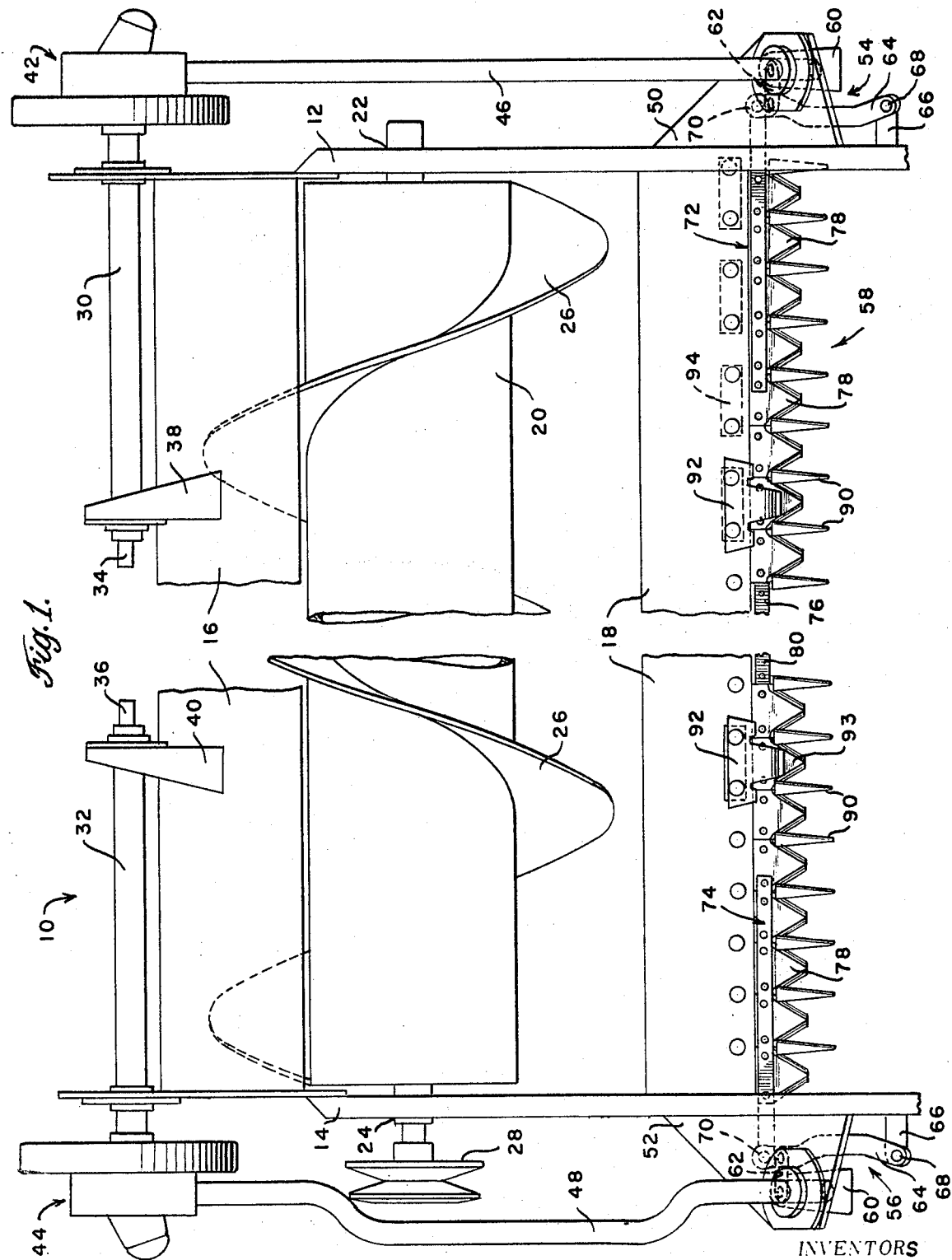
FIG. 1 is a fragmentary broken out plan view illustrating the general arrangement of the right- and left-hand wobble units for actuating the right- and left-hand sickle assemblies.

Referring now generally to the drawings, and specifically to FIG. 1, a header 10 for a large forage- or grain-cutting machine such as a windrower, forage harvester, or combine is adapted to be mounted on the forward end of such a machine (not shown). The header 10 is comprised of side frame members 12 and 14, a rearwardly disposed transverse frame member 16 and a transverse cutter bar support frame including plate 18 and 18a. An auger cylinder 20 is mounted between the side panels and is journaled in the side panels 12 and 14 at 22 and 24, respectively. Along the auger cylinder 20 there is disposed a spirally wound auger flight 26 for consolidating crop material previously cut and conveying the material to a point generally midway along the header to discharge the same. The auger cylinder 20 is driven from a suitable power source (not shown) through a chain or belt drive (not shown) from either shaft 30, or 32. A belt or chain (not shown), drivingly engageable with a pulley structure 28, or the like, mounted on the horizontal drive shaft of the auger cylinder, drives the header reel, not shown, but well known in the art.

A pair of wobble drive shafts 30 and 32 are mounted on the upper, rearward portion of header 10, as shown in FIG. 1. The drive shafts 30 and 32, having inboard ends 34 and 36, are journaled in side frame members 12 and 14 and in stanchions 38 and 40, respectively, the stanchions being fixed by one end to frame 16 as illustrated in FIG. 1. Mounted on the outer ends of drive shafts 30 and 32 are wobble drive units 42 and 44. The inboard ends 34 and 36 of the drive shafts are adapted to be connected to a suitable power source (not shown) such as the type provided on a combine, windrower, or forage-harvesting machines and well known in the art. The rotary input motion from the power source is transmitted through the drive shafts 30 and 32 to the wobble units 42 and 44, which, in turn, convert the rotary power input into an oscillatory output motion. The operation of a wobble drive unit is well known in the art and forms no part of the present invention and, therefore, will not be described in detail.

The oscillatory output motion from the wobble drive means 42 and 44 is transmitted to the driving shafts 46 and 48 which are connected by their upper ends to the wobble drive units 42 and 44, respectively, in a manner well known in the art. The driving shafts 46 and 48 are journaled in the outwardly extending frame members 50 and 52, respectively, which extend outwardly from side frame members 12 and 14, as illustrated in FIG. 1. In this manner, the driving shafts are caused to oscillate. The lower ends of the drive shafts 46 and 48 are engageable with connecting means 54 and 56 which serve as connecting links between the drive means and a sickle means 58. Each of the connecting means 54 and 56 is comprised of a lever portion 60, a link 62, a sickle-actuating lever 64, a fixed bracket 66, a pin 68, and a pin 70. The lever 60 is connected by one end thereof to the lower end of the drive shafts 46 and 48, while the other end of the lever 60 is pivotally connected to a link 62, which joins lever 60 with the sickle-actuating lever 64, as illustrated in FIG. 1. Lever 64 is pivotally connected at one end thereof to the fixed bracket 66 by pin 68, while the other end of the lever is pivotally connected to sickle bars 72 and 74 by the pin 70.

The sickle means 58 is comprised of the sickle bar assemblies 72 and 74 which extend approximately halfway across header 10 respectively. The first, or left-hand sickle bar 72 is provided with a knife back 76 which extends inwardly from side frame member 12 of header 10, in a plane generally horizontal to the ground, and terminates at an inboard end 77, approximately midway of header 10, as shown in FIGS. 1, 2 and 3. The sickle bar assembly 72, with its knife back 76 form an integral unit having upper and lower surfaces and extend inwardly from the pin connection 70 forming a plane which is generally parallel to the ground. A plurality of the knives 78 forming the cutting elements, are fixed along the upper surface of knife back 76 by means of rivets 86.

The sickle bar assembly 74 extends inwardly from beyond side frame member 14 and terminates at inboard end 81, also substantially midway of header 10. The second, or right-hand sickle bar assembly 74 also has a knife back 80 integral therewith which is similar to the knife back 76 previously described. Sickle bar assembly 74 extends inwardly in a plane generally horizontal with the ground, but the right-hand sickle assembly is in a plane which is spaced the thickness of a knife section higher above the other, as best illustrated in FIG. 3. A plurality of knives, or cutting elements 82 are mounted on the upper surface of knife back 80 also by means of rivets 86.

At the inboard end 77 of sickle bar 72, the last knife element 84, which is mounted adjacent the end of the bar as shown in FIGS. 2 and 3, is inverted with respect to the other knives so that the cutting surfaces 79 are disposed so as to be facing downwardly from the bottom surface of the blade rather than being conventionally mounted with the knife edges facing upwardly from the top surface of the blade, as shown in FIG. 2. The purpose of this arrangement will be hereinafter described in detail.

Extending inwardly from the second sickle assembly 74 is a knife back extension 89 which is fixed adjacent the end 81 of sickle bar 74 over the knife elements 82 by means of rivets 95. The knife back extension 89, having upper and lower surfaces, extends horizontally outwardly from the inboard terminal end 81 across the space between the two sickle bars assemblies and over the inboard terminal end 77 of the first sickle bar 72, as shown in FIGS. 2 and 3. A plurality of knife elements 82a are mounted on the underside of knife bar extension by means of countersunk rivets 88.

Extending forwardly from the cutter bar support 18 and 18a are a plurality of knife guards 90 which extend outwardly around the knives, as shown in FIGS. 4—7, to protect the knives from obstructions during the operation of the mowing device. The guards 90 are provided with surfaces 90a and 90b, on each side thereof which are formed by the lower portion and the upper tongue portion of the guard through which the knives reciprocate. The surfaces 90a and 90b form ledger surfaces against which crop material is cut by the knives. At the midpoint of the sickle assembly 58, another guard member 98 is provided to protect the knives 82a and 84 which overlap at the midpoint. To permit the knife overlap at the midpoint of the sickle assembly, the upper tongue portion is removed. The guards, then, serve two purposes during the operation of the sickle means 58, namely they protect the cutting elements and they provide a shearing surface against which the knives act to perform the cutting operation.

Figure 4:
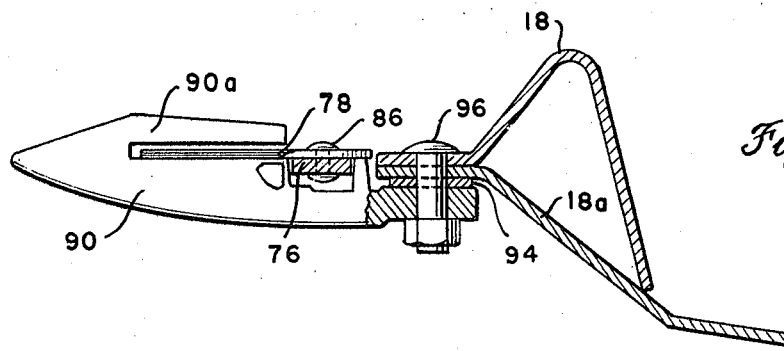
FIG. 4 is an enlarged section view, taken on line 4–4 of FIG. 2, showing the mounting of the knive guards and knives of the left-hand sickle.
Figure 5:
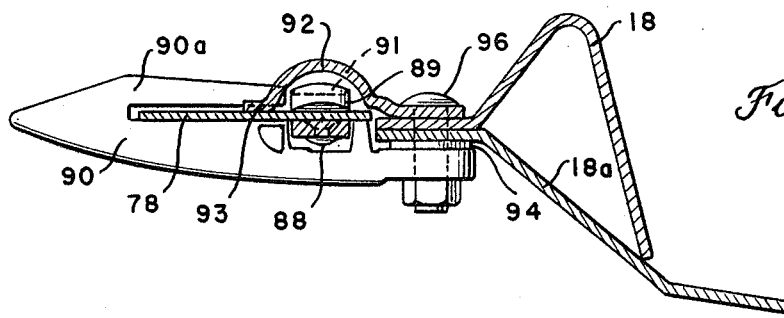
FIG. 5 is an enlarged section view, taken on line 5–5 of FIG. 2, showing the holddown clip and its relation to the guard and knives of the left-hand sickle assembly.
Figure 6:
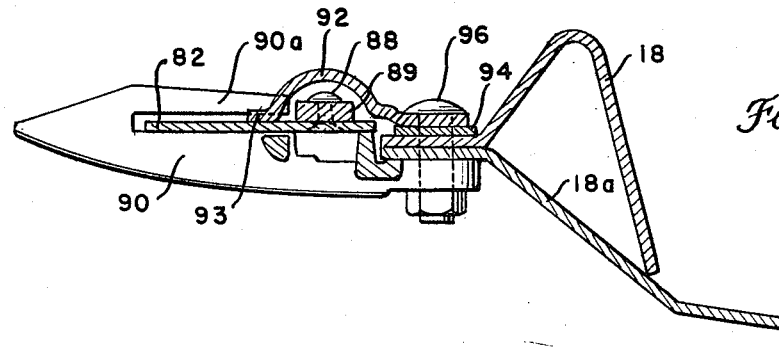
FIG. 6 is an enlarged section view taken on line 6–6 of FIG. 2 showing a holddown clip for the right-hand sickle assembly.
Figure 7:
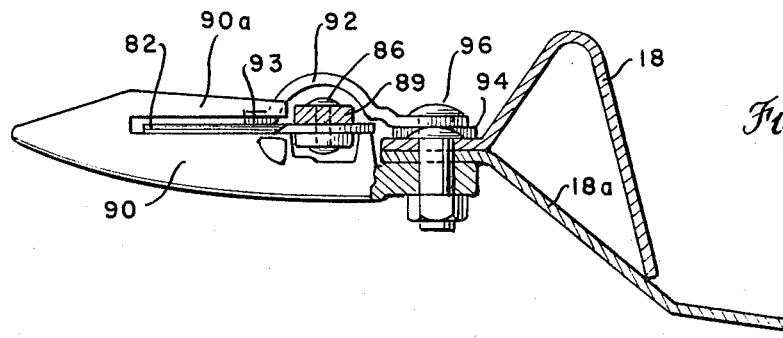
FIG. 7 is an enlarged section view taken on line 7–7 of FIG. 2 showing the assembled elements of the right-hand sickle assembly.

Also extending forwardly from cutter bar support members 18 and 18a are a plurality of knife holddown clips 92 which are mounted in a spaced-above relation from the cutter bar support 18 by shims 94. As illustrated in FIG. 4, the shims 94 disposed on the left-hand sickle bar assembly 72 are mounted adjacent the lower surface of plate 18a between the plate and guard 90 so as to space the knives 78 a blade thickness lower than the plane of the knives 82 and 82a of the right-hand sickle bar 74. As shown in FIG. 6, the shim 94 of the left-hand sickle assembly 74 is mounted above plate 18, but below the knife clip 92. Mounting means 96, such as the nut and bolt illustrated, are used to fix the knife guards and knife holddown clips to the cutter bar support members. The knife clips 92 are designed with a high arched back portion to permit the knife back extension to pass under them during operation of the machine and are adapted to keep the cutting elements from lifting up to any appreciable extent during the cutting operation by applying a downward force on the cutting elements through the contact of tongue portion 93 with the knives 78, 82 and 82a.

In operation, motive power is transmitted to the wobble units 42 and 44 where the rotary input is transformed into an oscillatory output. The output drive force is transferred from the wobble units to the drive shafts 46 and 48 and from there to the connecting means 54 and 56 to individually reciprocate the sickle bar assemblies 72 and 74 from opposite sides of the header and conversely with respect to each other. The converse or opposed reciprocation of the sickle bars substantially reduces the magnitude of the vibrations set up in the header. The inboard ends 77 and 81 of sickle bars 72 and 74 terminate in a spaced-apart relation generally midway of the header 10 so that they will not interfere with each other as they reciprocate. A continuous cutting surface is achieved, however, in spite of the space between the bars, by arranging the knives of each sickle bar in different planes, one above the other. The knife back extension which extends across the space between the sickle bars is provided with knives 82a, spaced therealong one knife thickness above the inverted knife 84 disposed on the terminal end 77 of sickle bar 72 and they cooperate therewith to shear crop materials at the center of the header. The attachment of the knives in the area of overlap of the sickle bars using countersunk rivets 88 and the knife back extension providing a guide on the top end section of sickle bar 76 further prevents the conversely reciprocating knives from engaging and interfering with each other during operation.

By using a sickle assembly of the type hereinbefore described, the individual knife length and mass is greatly reduced as those skilled in the art will understand. Through this length-mass reduction, the sickle bars may then be reciprocated at higher frequencies to produce a higher cutting speed without excessive energy transfer or prohibitive loads. Further, vibrations established in the header due to the high speed of operation, are notably reduced since the dynamic symmetry of the assembly design provides a force and mass transfer equilibrium.

We claim:
1. A mowing device comprising in combination: a frame structure adapted for forward travel over the ground having standing crop thereon; a cutter bar of generally uniform size transversely mounted within said frame structure; a plurality of substantially uniform length identical knife guards mounted in transverse alignment on said cutter bar and projecting forwardly therefrom; first and second conversely reciprocating sickle bars having outboard and inboard ends and upper and lower surfaces operable within said knife guards, said sickle bars being disposed in transverse alignment with the inboard ends terminating in spaced-apart relationship at a midportion of said cutter bar; knife elements mounted on the upper surface of said first and second sickle bars and cooperable with said knife guards for cutting crop material, the knife elements being mounted on said first and second sickle bars in transverse alignment, the leading edges of said first and second sickle bars lying in substantially the same vertical plane, said first sickle bar and said knife elements affixed thereto being disposed one knife element thickness below said second sickle bar and said knife elements secured thereto; a knife back extension having upper and lower surfaces mounted on the upper surface adjacent the inboard end of said second sickle bar and extending outwardly therefrom over the upper surface of said first sickle bar in transverse alignment with both said first and second sickle bars; a plurality of knives mounted on the lower surface of said knife back extension for cooperating with said knife guards mounted between said inboard ends of said first and second sickle bars and said knife elements of said first sickle bar; drive means on said frame structure for providing oscillatory motion; and means connecting said drive means to each outboard end of said sickle bars for transferring oscillatory motion thereto to cause reciprocation thereof.

2. A mowing device as recited in claim 1 wherein the knife element mounted on the extreme end of said first sickle bar is inverted to cooperate with the outermost knife of the knife back extension which lies in a plane one knife thickness above the plane of the inverted knife, whereby the two knives cooperate to shear crop material entering therebetween as they are reciprocated relative to each other.